United States Patent
Stavi (10) Patent No.: US 9,612,633 B2
(45) Date of Patent: Apr. 4, 2017

(54) PASSIVELY COOLED SERVICEABLE DEVICE

(71) Applicant: COMPULAB LTD., Yokneam Elite (IL)

(72) Inventor: Irad Stavi, Yokneam Elite (IL)

(73) Assignee: CompuLab Ltd., Yokneam Elite (IL)

( * ) Notice: Subject to any disclaimer, the term of this patent is extended or adjusted under 35 U.S.C. 154(b) by 62 days.

(21) Appl. No.: 14/625,636

(22) Filed: Feb. 19, 2015

(65) Prior Publication Data

US 2016/0246338 A1 Aug. 25, 2016

(51) Int. Cl.
*G06F 1/16* (2006.01)
*G06F 1/20* (2006.01)

(52) U.S. Cl.
CPC ..................... *G06F 1/20* (2013.01)

(58) Field of Classification Search
CPC ........................................................ G06F 1/20
See application file for complete search history.

(56) References Cited

U.S. PATENT DOCUMENTS

| | | | |
|---|---|---|---|
| 3,961,666 A | 6/1976 | Suzuki et al. | |
| 4,241,380 A | 12/1980 | Lehmann | |
| 5,606,341 A * | 2/1997 | Aguilera | F28D 15/0266 345/87 |
| 5,671,120 A | 9/1997 | Kikinisi | |
| 5,842,514 A * | 12/1998 | Zapach | H01L 23/427 165/104.33 |
| 6,157,538 A | 12/2000 | Ali et al. | |
| 6,175,494 B1 | 1/2001 | Komatzu | |
| 6,234,240 B1 * | 5/2001 | Cheon | F28D 15/00 165/185 |
| 6,459,577 B1 | 10/2002 | Holmes et al. | |
| 6,478,082 B1 | 11/2002 | Li | |
| 6,714,410 B2 * | 3/2004 | Wellhofer | G02F 1/133385 297/67 |
| 6,961,241 B2 | 11/2005 | Lee | |
| 7,044,212 B1 | 5/2006 | Hofmann | |
| 7,418,995 B2 | 9/2008 | Howard et al. | |
| 7,480,140 B2 | 1/2009 | Hara et al. | |
| 7,724,521 B2 * | 5/2010 | Nelson | H05K 7/20163 361/690 |
| 8,451,604 B2 | 5/2013 | Bhattacharya et al. | |
| 2002/0043364 A1 | 4/2002 | Suzuki et al. | |
| 2004/0179470 A1 * | 9/2004 | Nguyen | G06F 1/206 370/216 |

(Continued)

FOREIGN PATENT DOCUMENTS

| | | |
|---|---|---|
| EP | 1333359 | 8/2003 |
| EP | 1455261 | 9/2004 |

(Continued)

OTHER PUBLICATIONS

International Search Report for PCT application No. PCT/IL2016/050186 dated Jun. 14, 2016.

*Primary Examiner* — Anthony Q Edwards
(74) *Attorney, Agent, or Firm* — Pearl Cohen Zedek Latzer Baratz LLP (57) ABSTRACT

A device includes a casing with two separable outer walls. Each of the walls is configured to passively dissipate heat. Two units that produce heat during operation are each thermally coupled to a different wall of the two outer walls.

17 Claims, 4 Drawing Sheets

(56) References Cited

U.S. PATENT DOCUMENTS

| | | | |
|---|---|---|---|
| 2004/0228093 A1* | 11/2004 | Lee | G06F 1/181 |
| | | | 361/701 |
| 2004/1228093 | 11/2004 | Lee | |
| 2005/0219820 A1* | 10/2005 | Belady | G06F 1/20 |
| | | | 361/700 |
| 2006/0452904 | 7/2006 | Chaung | |
| 2006/0215357 A1* | 9/2006 | Green | G06F 1/20 |
| | | | 361/678 |
| 2007/0076376 A1* | 4/2007 | Mongia | G06F 1/20 |
| | | | 361/700 |
| 2007/0184245 A1* | 8/2007 | Ku | G06F 1/181 |
| | | | 428/143 |
| 2008/0037222 A1* | 2/2008 | Jha | H05K 7/20445 |
| | | | 361/709 |
| 2008/0101026 A1 | 5/2008 | Ali | |
| 2009/0067128 A1 | 3/2009 | Kunz | |
| 2009/0175006 A1 | 7/2009 | Jou et al. | |
| 2010/0097751 A1* | 4/2010 | Doll | H05K 7/20736 |
| | | | 361/679.47 |
| 2010/0259899 A1* | 10/2010 | Facusse | H05K 7/20809 |
| | | | 361/709 |
| 2015/0261265 A1* | 9/2015 | Dean | G06F 1/20 |
| | | | 361/679.31 |
| 2016/0034007 A1* | 2/2016 | Helberg | G06F 1/20 |
| | | | 361/679.47 |

FOREIGN PATENT DOCUMENTS

| | | |
|---|---|---|
| EP | 1503615 | 2/2005 |
| EP | 2034387 | 3/2009 |

* cited by examiner

PASSIVELY COOLED SERVICEABLE DEVICE

FIELD OF THE INVENTION

The present invention relates to a passively cooled serviceable device.

BACKGROUND OF THE INVENTION

Computer systems are known to generate heat during operation. Excessive heat must be dissipated to the environment in order to prevent damage to the computer's components.

Heat sinks are thermally coupled to heat-generating components of the computer. Heat sinks may be provided with fins to promote passive cooling by increasing heat dissipation by radiation or passive convection. Often, active cooling is used for dissipating heat. Active cooling generally includes operation of fans or blower to cool the heat sinks by forced air convection.

SUMMARY OF THE INVENTION

There is thus provided, in accordance with an embodiment of the present invention, a device including: a casing including two separable outer walls, each of the walls configured to passively dissipate heat; and two units that produce heat during operation, each of the units being thermally coupled to a different wall of the two outer walls.

Furthermore, in accordance with an embodiment of the present invention, a unit of the two units is permanently thermally coupled to a wall of the two outer walls.

Furthermore, in accordance with an embodiment of the present invention, a unit of the two units includes a central processing unit (CPU) or a graphics card.

Furthermore, in accordance with an embodiment of the present invention, the casing is configured to enclose a removable component that is accessible for servicing when the walls are separated from one another.

Furthermore, in accordance with an embodiment of the present invention, the removable unit includes a hard disk or a random-access memory (RAM) module.

Furthermore, in accordance with an embodiment of the present invention, the walls are hinged to enable separation of one of the walls from the other.

Furthermore, in accordance with an embodiment of the present invention, the device includes an electrical connector that is engaged when the walls are attached to one another and that is opened when the walls are separated from one another.

Furthermore, in accordance with an embodiment of the present invention, the connector includes an edge of a Peripheral Component Interconnect (PCI) Express card on one of the walls, and a PCI Express card receptacle on the other of the walls.

Furthermore, in accordance with an embodiment of the present invention, a wall of the two outer walls includes a cooling channel to facilitate chimney effect cooling of that wall when the channel is oriented substantially vertically.

Furthermore, in accordance with an embodiment of the present invention, the device includes a flexible connector that extends from one of the walls to the other.

There is further provided, in accordance with an embodiment of the present invention, a computer including: a casing including two separable outer walls, each of the walls configured to passively dissipate heat; and a CPU that is thermally coupled to one of the walls.

Furthermore, in accordance with an embodiment of the present invention, a graphics card is thermally coupled to a wall of the two walls to which the CPU is not thermally coupled.

Furthermore, in accordance with an embodiment of the present invention, the CPU is permanently attached to the one of the walls.

Furthermore, in accordance with an embodiment of the present invention, the computer includes a removable component that is accessible for servicing when the walls are separated from one another.

Furthermore, in accordance with an embodiment of the present invention, the removable unit includes a hard disk or a random-access memory (RAM) module.

Furthermore, in accordance with an embodiment of the present invention, the walls are hinged to enable separation of one of the walls from the other.

Furthermore, in accordance with an embodiment of the present invention, the computer includes an electrical connector that is engaged when the walls are closed and that is disengaged when the walls are opened by being separated from one another.

Furthermore, in accordance with an embodiment of the present invention, the connector includes an edge of a Peripheral Component Interconnect (PCI) Express card on one of the walls, and a PCI Express card receptacle on the other of the walls.

Furthermore, in accordance with an embodiment of the present invention, a wall of the two outer walls includes a cooling channel to facilitate chimney effect cooling of that wall when the channel is oriented substantially vertically.

Furthermore, in accordance with an embodiment of the present invention, the computer includes a flexible connector that extends from one of the two walls to the other.

BRIEF DESCRIPTION OF THE DRAWINGS

In order for the present invention, to be better understood and for its practical applications to be appreciated, the following figures are provided and referenced hereafter. It should be noted that the figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

In accordance with an embodiment of the present invention, a device is configured to passively cool units of the device that produce heat when in operation. For example, each of the units is thermally coupled to one of two outer walls of a casing of the device. The outer walls of the casing are configured to enclose the heat producing units and other components of the device.

The outer walls are configured to passively dissipate heat. For example, the walls may incorporate channels or tubes that when oriented substantially vertically, function as chimneys to enable circulation of ambient air through the channels. The resulting chimney effect may facilitate cooling of the wall by convective heat transfer. As another example, the walls may incorporate ribs, fins, heat pipes, or other passively operated devices to enhance heat transfer. The outer walls may thus act as heat sinks for the heat producing units, and as such are thermally coupled to the heat producing units. For example, the outer walls may include structure that is constructed of a suitable heat conducting material. Such a heat conducting may include a metal, such as copper, aluminum, or another metal, or another suitable heat conducting material.

As used herein, passive cooling or heat dissipation refers to cooling or heat dissipation that exclusively employs passive processes that do not require external power input. For example, passive cooling does not include cooling that involves powered operation of a motor or motorized device, such as an electrically or otherwise powered fan, blower, pump, compressor, or other powered device to force convection of air or otherwise effect heat transfer. Forms of excluded external power input may include electrical power, wind power or power derived from another ambient flowing fluid, an external heat source, a consumable chemical fuel, or other external power source.

As used herein, a heat producing unit refers to a unit that, when in operation, generates heat at a rate that is significantly greater than a rate of heat production by other components. For example, a heat producing unit may generate heat at a rate of at least 10 watts, e.g., over tens of watts (and in some cases, over 100 watts). On the other hand, other components that are not considered to be heat producing unit may generate heat at a rate of under 10 watts, and, in some cases, under 1 watt.

A heat producing unit may be permanently attached, or permanently thermally coupled to a wall of the device. As used herein, a unit is considered to be permanently attached to a wall when the device cannot be reversibly detached from the wall and reattached by ordinary reversible mechanical techniques or (such as reusable screws, nuts, or clips, or insertion of a plug or connector into a socket, or other reversible mechanical techniques. An attachment or thermal coupling is considered to be permanent when reattachment requires use of components that were not present prior to detachment (e.g., were broken or discarded during detachment, such as rivets, staples, welds, or similar attachments), requires providing additional material (such as thermal compound, thermal interface material, glue, epoxy, cement, solder, tape, or other material), or requires application of a non-mechanical device (e.g., heat source, e.g., for soldering or welding, or another curing agent).

As used herein, a unit is considered to be thermally coupled to a wall when the coupling enables heat transfer by thermal conduction between the unit and the wall.

During operation, units that are attached to different walls may be electrically connected. The electrical connection may enable the units to intercommunicate or to communicate with another unit or component of the device. The electrical connection may conduct electrical power to one unit to the other, or between the unit and another component.

The electrical connection may include a connector that is closed or engaged when the outer walls of the casing are attached to one another, thus closing the casing.

The casing may be opened by at least partially separating the two outer walls from one another. For example, the casing may have a clamshell configuration with hinged outer walls. In other cases, the outer walls may be completely separated from one another.

Opening the casing may enable access for servicing one or more internal components of the device. For example, servicing may include removal, addition, replacement, adjustment, or repair of the internal component.

In some cases, when the outer walls are opened or separated from one another, a connector forming the electrical connection is opened or disengaged. For example, the connector may include electrical contacts on one of the outer walls that are configured to engage cooperating contacts on the other outer wall when the outer walls are attached to one another. In other cases, the electrical connection may remain engaged when the outer walls are opened. For example, the electrical connection may include a flexible connector that extends from one of the outer walls to the other. For example, the flexible connector may electrically connect the heat producing units to one another. The flexible connector may connect one of the heat producing units to another component. The flexible connector may include a flexible wire, cable, strip, band, braid, or other flexible connector. The flexible connector may be configured to maintain the electrical connection when the walls are opened, without interfering with access to the interior of the device.

As used herein, opening the outer walls or separation of the outer walls from one another may include complete detachment of one wall from the other. Separation may include partial detachment of one wall from the other. For example, the outer walls may be joined to one another along a hinge or other structure that enables rotation of one of the walls relative to the other while remaining connected to one another.

For example, the passively cooled serviceable device, in accordance with an embodiment of the present invention, may include a computer, e.g., of a desktop or similar computer system. Such a computer may be connectable to one or more external components, such as an output device (e.g., display screen, speaker, printer, or other output device), input device (e.g., keyboard, pointing device, microphone, scanner, camera, or other input device), a data storage or memory device, communications devices or media (e.g., modem, router, telephone, fax, network, telephone line, or other communications device or medium), or another external component.

For example, a heat producing unit such as a central processing unit (CPU) may be attached and thermally coupled to one of the outer walls. Another heat producing unit, such as a graphics card, may be attached and thermally coupled to another of the other walls. A device may include one or more other heat producing units instead of one or both of the CPU and graphics card. One or more additional heat producing units (e.g., a power supply, or other heat producing unit) may be attached and thermally coupled to one of the walls.

Additional components, that produce significantly less heat than the heat producing units, may be placed internally to the device. For example, an interior of the device, accessible when the outer walls are separated from one another, may include one or more slots, holders, connectors, or other preparation for receiving or connecting one or more additional components. Such additional components may include, for example, a hard disk, a random access memory (RAM) module, or a card that is connectable to a standard card slot. Since such additional components need not be permanently attached to an outer wall of the device, such additional components are herein referred to as removable components.

A passively cooled serviceable device, in accordance with an embodiment of the present invention, may be advantageous over other types of devices.

For example, an actively cooled device may include fans or blowers that are noisy and could be distracting or disturbing to user of the device. Active components, such as fans or blowers, are subject to mechanical wear and performance degradation over time. Fans or blowers typically require a space within which to operate, thus increasing a size of the device. On the other hand, typical use of passive cooling may be limited to devices that do not produce large amounts of heat, or that contain only small components. A typical passively cooled device, in which components are attached to walls of the device, may not enable access for servicing to a user or typical technician. Access to internal components may be limited to specially trained technicians with access to specialized equipment, materials, or techniques. Thus, a typical passively cooled device may not be modifiable by a user.

Thus, a passively cooled serviceable device, in accordance with an embodiment of the present invention, may be smaller, run more quietly, and be more energy efficient than an actively cooled device having a similar function. The passively cooled serviceable device may enable cooling of devices that produce heat at a rate that is comparable to that of actively cooled devices of similar function. The passively cooled serviceable device may enable access to internal components in a manner that is not available in a typical passively cooled device.

For example, a passively cooled serviceable device may include a computer or similar device with heat producing components.

Figure 1:
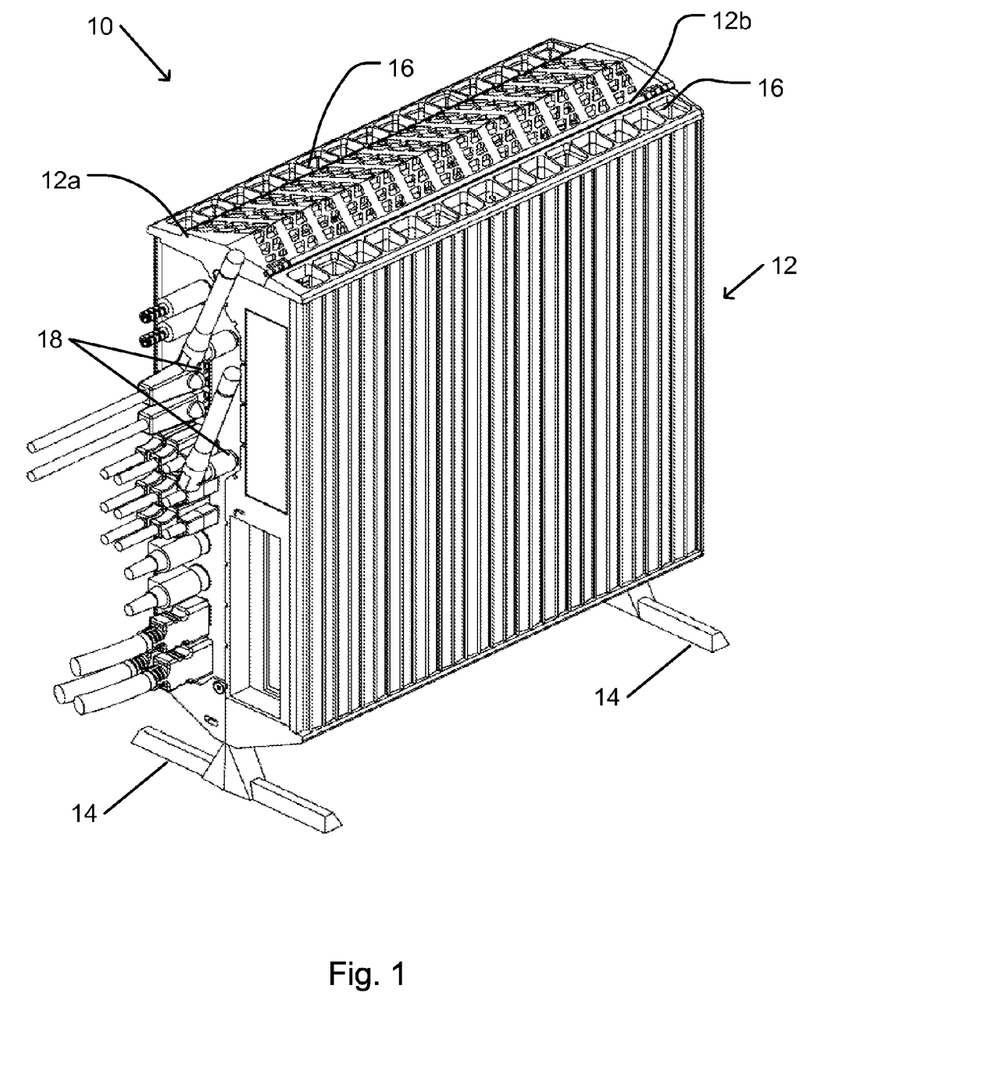
FIG. 1 schematically illustrates a passively cooled serviceable device in accordance with an embodiment of the present invention.

FIG. 1 schematically illustrates a passively cooled serviceable device in accordance with an embodiment of the present invention.

A passively cooled serviceable device may have the form of a computer 10, or other device. For example, computer 10 may be designed to sit on a desktop or elsewhere in the vicinity of one or more input or output devices that may be utilized by a user to communicate with computer 10.

A passively cooled serviceable device may include a device other than, or in addition to, a computer. For example, a passively cooled serviceable device may include a controller for a system, a display device (e.g., monitor or television), a communications device, a sound generation or audio device, or another device that includes one or more heat producing units.

Components of computer 10 may be enclosed in casing 12. Casing 12 may be configured to stand on legs 14, or may be otherwise mounted on, suspended from, or otherwise supported by a surface such as a desktop, tabletop, countertop, floor, shelf, rack, wall, ceiling, beam, or other support. Casing 12 may include one or more connectors 18 to enable connection of computer 10 to one or more external power sources, networks, or peripheral devices (e.g., input devices, output devices, data storage or memory devices, communication devices, or other peripheral devices), or other external devices.

Casing 12 includes separable outer walls. The outer walls are herein designated for convenience as first outer wall 12*a* and second outer wall 12*b*. First outer wall 12*a* and second outer wall 12*b* are configured to be passively cooled. For example, one or both of first outer wall 12*a* and second outer wall 12*b* may be provided with cooling channels 16. Cooling channels 16 may facilitate chimney effect cooling of first outer wall 12*a* or second outer wall 12*b*. Chimney effect cooling may occur when first outer wall 12*a* or second outer wall 12*b* is oriented such that cooling channels 16 are approximately vertical (e.g., a longitudinal axis of each channel 16 is substantially vertical). Alternatively or in addition, first outer wall 12*a* or second outer wall 12*b* may be provided with other structure to promote or facilitate passive cooling of first outer wall 12*a* or second outer wall 12*b*. For example, first outer wall 12*a* or second outer wall 12*b* may be provided with one or more of fins, emissive (e.g., infrared absorbing) surfaces, heat pipes, or other type of structure that may promote radiative, conductive, or convective heat transfer from first outer wall 12*a* or second outer wall 12*b* to an ambient environment.

In some cases, a casing may include more than two separable walls. For example, one or both of two separable walls may in turn be separable into two or more component walls. A casing may have a triangular, rectangular, or other polygonal prism, pyramidal, or other multisided configuration with three or more mutually separable walls. In such a case, each of some or all of the walls may be permanently attached and thermally coupled to a different unit of three or more heat producing units.

Casing 12 may encase heat producing units and other components of computer 10.

Figure 2:
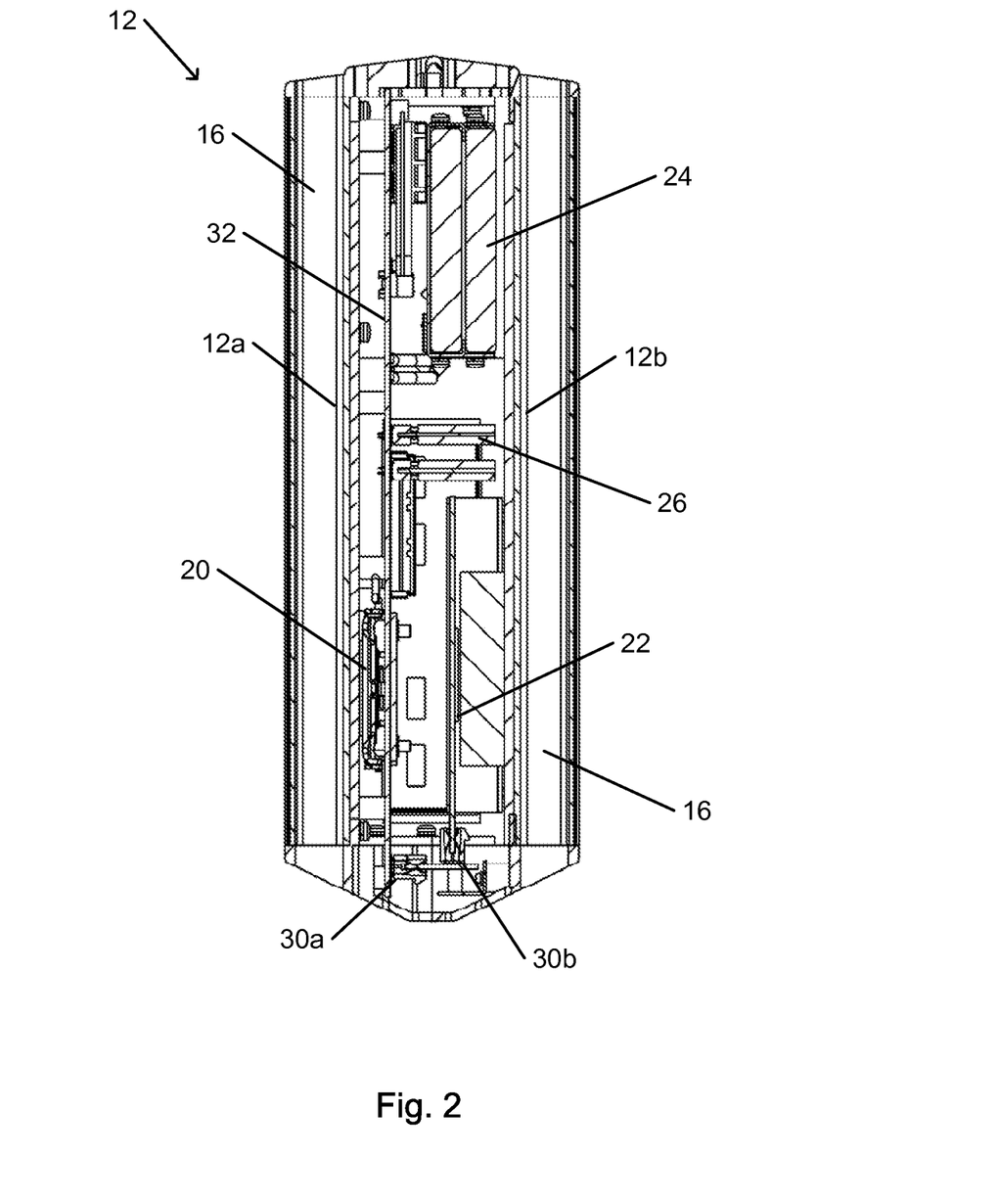
FIG. 2 shows a schematic cross section of the passively cooled serviceable device shown in FIG. 1.
Figure 3:
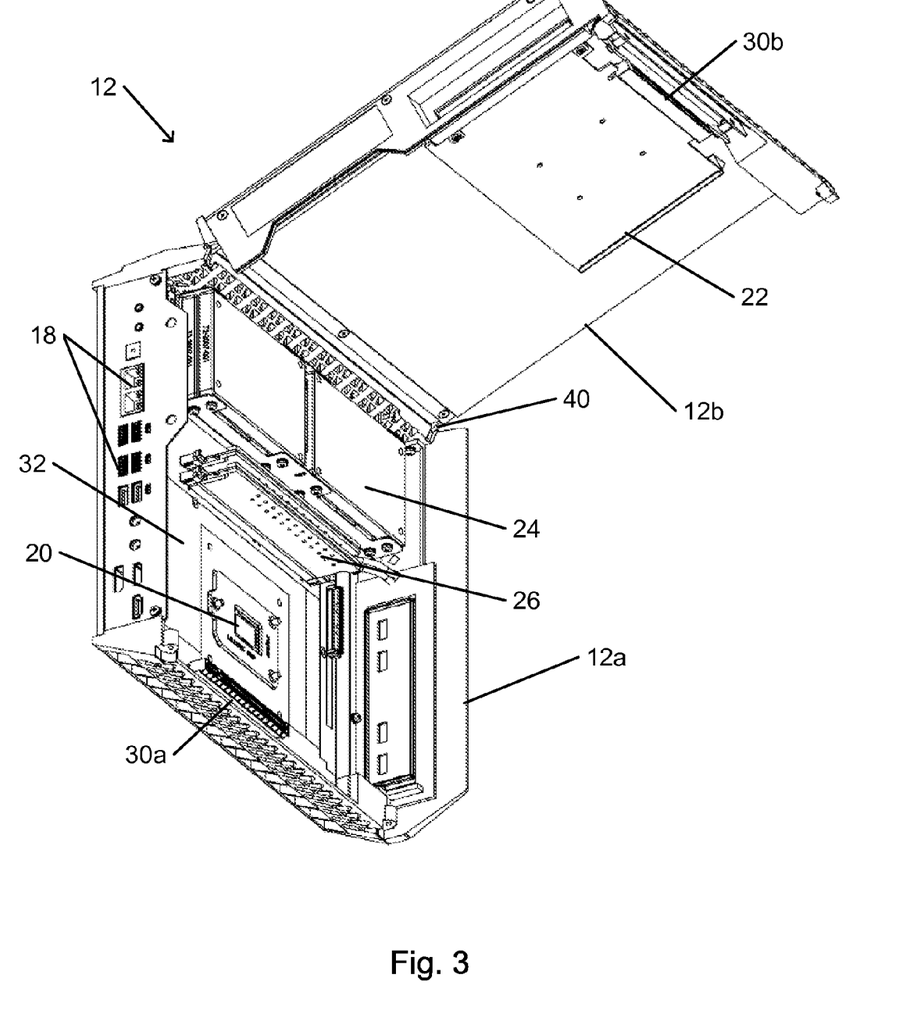
FIG. 3 schematically illustrates the passively cooled serviceable device of FIG. 1 when opened.

FIG. 2 shows a schematic cross section of the passively cooled serviceable device shown in FIG. 1. FIG. 3 schematically illustrates the passively cooled serviceable device of FIG. 1 when opened.

First outer wall 12*a* may be separated from second outer wall 12*b* by rotation of one or both of first outer wall 12*a* and second outer wall 12*b* about casing hinge 40. A latch mechanism may be provided to prevent accidental or unintentional separation of first outer wall 12*a* from second outer wall 12b. One or more interlock systems may be provided to prevent separation of first outer wall 12a from second outer wall 12b when computer 10 is in operation, or under other circumstances when it is determined that casing 12 should remain closed.

Alternatively or in addition to a hinge-based (clamshell) separation mechanism, first outer wall 12a and second outer wall 12b may be separated from one another using another mechanism. For example, one or more columns that connect first outer wall 12a to second outer wall 12b may be extendible (e.g., telescoping, folding, elastic, or otherwise extendible) to enable access to an interior of casing 12. First outer wall 12a may be completely separable from second outer wall 12b. For example, one or more latches, clips, screws, pins, or other mechanisms may be opened or removed to enable completed separation of first outer wall 12a from second outer wall 12b.

Heat producing units of computer 10 may be permanently attached and thermally coupled to one of the separable outer walls of casing 12. For example, CPU 20 may be permanently attached and thermally to first outer wall 12a and graphics card 22 may be permanently attached and thermally coupled to second outer wall 12b. For example, the permanent attachment and thermal coupling may include one or more of bonding (e.g., with a thermally conductive glue, cement, epoxy, thermal compound, or other thermal interface material), soldering or welding, riveting, or other permanent attachment. In some cases, the attachment or thermal coupling to one of the outer walls of casing 12 may be non-permanent.

CPU 20 (or another heat producing electronic component) may be electrically connected and mechanically attached to motherboard 32. Motherboard 32 is connected to first connector component 30a. Alternatively or in addition, CPU 20 or another heat producing unit may be connected directly to first connector component 30a. For example, first connector component 30a may include a socket, plug, or other connector component. For example, first connector component 30a may include a PCI Express card receptacle, or another suitable connector component.

Graphics card 22 (or another heat producing electronic component) is electrically connected to second connector component 30b. For example, second connector component 30b may include or plug, socket, or other component that is configured to connect to first connector component 30a. For example, second connector component 30b may include an edge of a PCI Express card, or another suitable connector component that is configured to engage first connector component 30a.

When casing 12 is closed, first connector component 30a and second connector 30b are connected or engaged. For example, an edge of a PCI Express card may be inserted into a PCI Express card or connector receptacle. Alternatively or in addition, one or more other types of plugs for carrying an electronic or optical signal may be inserted into a corresponding one or more cooperating sockets. As another example, one or more connector contacts on first outer wall 12a may contact a corresponding connector contact on second outer wall 12b when casing 12 is closed.

Thus, when casing 12 is closed, CPU 20 may communicate with graphics card 22 (or two or more other heat producing units may intercommunicate), or with another component of computer 10, via the engaged or closed connection between first connector component 30a and second connector 30b. When casing 12 is opened, communication between CPU 20 and graphics card 22 (or between two or more other heat producing units, or with another component of computer 10) is broken by the disengaged or opened connection between first connector component 30a and second connector 30b.

Alternatively or in addition to connection via first connector component 30a and second connector 30b, one or more components on first outer wall 12a may be otherwise connected to one or more components on second outer wall 12b. For example, one or more permanent connections (e.g., that are not broken when casing 12 is opened) may connect first outer wall 12a and second outer wall 12b. For example, a permanent connection may include a wire, cable, or other flexible connection that connects first outer wall 12a to second outer wall 12b via hinge 40 or otherwise.

Opening casing 12 by separation of first outer wall 12a from second outer wall 12b may enable access to the interior of casing 23. Access to the interior of casing 12 may enable servicing of heat producing units such as CPU 20, graphics card 22, or another permanently attached heat producing or other unit.

Opening casing 12 by separation of first outer wall 12a from second outer wall 12b may enable insertion or installation, servicing, or removal of one or more removable components. A typical removable component does not, in operation, generate sufficient heat as to require thermal contact with one or the other of first outer wall 12a or of second outer wall 12b. Thus, there may be no need, at least for the purpose of heat removal, to permanently attach or thermally couple the removable component to one or the other of first outer wall 12a or of second outer wall 12b.

For example, a removable component of a computer 10 may include some or all of one or more hard disks 24, one or more read-only memory (RAM) modules 26, or other removable cards or components. Thus, opening casing 12 may enable insertion or installation of, removal of, or other servicing of (changing a setting of, adjusting a contact of, or otherwise servicing), hard disk 24, RAM module 26, or another removable component.

In some cases, a connection between heat producing units or between other components of computer 10 may remain engaged when casing 12 is opened.

Figure 4:
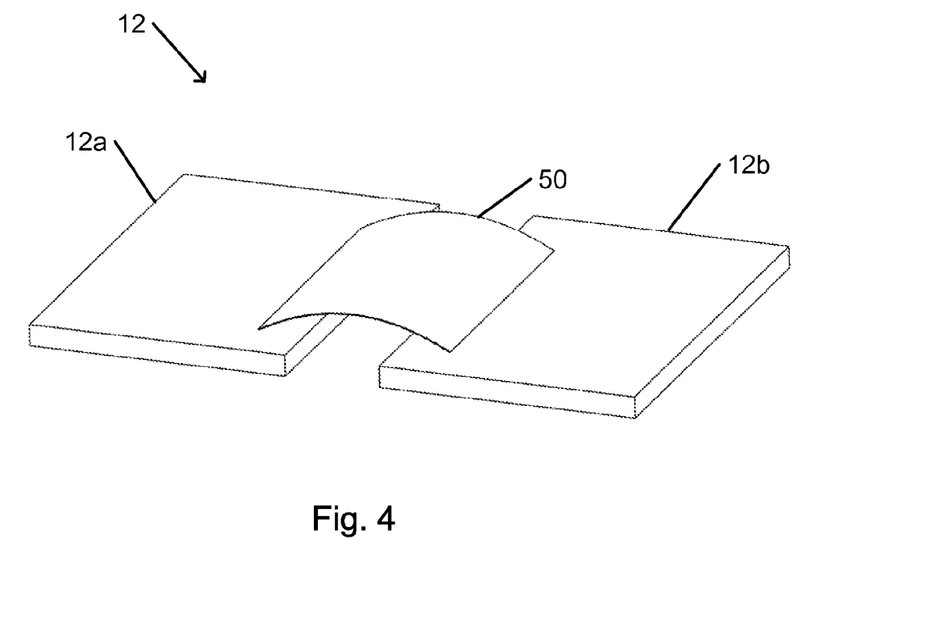
FIG. 4 schematically illustrates a passively cooled serviceable device with a flexible connector, in accordance with an embodiment of the present invention.

FIG. 4 schematically illustrates a passively cooled serviceable device with a flexible connector, in accordance with an embodiment of the present invention.

First outer wall 12a and second outer wall 12b of casing 12 are connected by flexible connector 50. For example, flexible connector 50 may include one or more flexible wires, cables, strips, bands, or braids that connect one or more components in outer wall 12a with one or more components in second outer wall 12b. Thus, a connection between the components in the separate outer walls may be remain intact after separation of outer wall 12a from second outer wall 12b, as shown.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A device comprising:
a casing comprising two separable outer walls, each of the walls covered with an array of cooling channels to facilitate chimney effect cooling of that wall when the channels are oriented substantially vertically to passively dissipate heat; and
two units that produce heat during operation, each of the units being thermally coupled to a different wall of the two outer walls.

2. The device of claim 1, wherein a unit of the two units is permanently thermally coupled to a wall of the two outer walls.

3. The device of claim 1, wherein a unit of the two units comprises a central processing unit (CPU) or a graphics card.

4. The device of claim 1, wherein the casing is configured to enclose a removable component that is accessible for servicing when the walls are separated from one another.

5. The device of claim 1, wherein each of the units produces heat at a rate of at least 10 watts when in operation.

6. The device of claim 1, wherein the walls are hinged to enable separation of one of the walls from the other.

7. The device of claim 1, comprising an electrical connector that is engaged when the walls are attached to one another and that is opened when the walls are separated from one another.

8. The device of claim 7, wherein the connector comprises an edge of a Peripheral Component Interconnect (PCI) Express card on one of the walls, and a PCI Express card receptacle on the other of the walls.

9. The device of claim 1, comprising a flexible connector that extends from one of the walls to the other.

10. A computer comprising:
a casing comprising two separable outer walls, each of the walls covered with an array of cooling channels to facilitate chimney effect cooling of that wall when the channels are oriented substantially vertically to passively dissipate heat;
a flexible connector that extends from one of the two walls to the other; and
a CPU that is thermally coupled to one of the walls.

11. The computer of claim 10, wherein a graphics card is thermally coupled to a wall of the two walls to which the CPU is not thermally coupled.

12. The computer of claim 10, wherein the CPU is permanently attached to said one of the walls.

13. The computer of claim 10, comprising a removable component that is accessible for servicing when the walls are separated from one another.

14. The computer of claim 13, wherein the removable unit comprises a hard disk or a random-access memory (RAM) module.

15. The computer of claim 10, wherein the walls are hinged to enable separation of one of the walls from the other.

16. A computer comprising:
a casing comprising two separable outer walls, each of the walls covered with an array of cooling channels to facilitate chimney effect cooling of that wall when the channels are oriented substantially vertically to passively dissipate heat;
an electrical connector that is engaged when the walls are closed and that is disengaged when the walls are opened by being separated from one another; and
a CPU that is thermally coupled to one of the walls.

17. The computer of claim 16, wherein the connector comprises an edge of a Peripheral Component Interconnect (PCI) Express card on one of the walls, and a PCI Express card receptacle on the other of the walls.

* * * * *